United States Patent
Gazdziak et al.

(10) Patent No.: US 10,499,235 B2
(45) Date of Patent: Dec. 3, 2019

(54) WIRELESS AD-HOC NETWORK FLOODING MECHANISM TO INTELLIGENTLY LOCATE REQUIRED RESPONDERS

(71) Applicant: MOTOROLA SOLUTIONS, INC, Chicago, IL (US)

(72) Inventors: Mateusz Gazdziak, Borowa (PL); Pawel Arkadiusz Jedrzejewski, Cracow (PL); Dominik Trzupek, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/306,944

(22) PCT Filed: Jul. 29, 2016

(86) PCT No.: PCT/PL2016/050034
§ 371 (c)(1),
(2) Date: Dec. 4, 2018

(87) PCT Pub. No.: WO2018/021922
PCT Pub. Date: Feb. 1, 2018

(65) Prior Publication Data
US 2019/0149974 A1     May 16, 2019

(51) Int. Cl.
*H04W 4/90* (2018.01)
*H04W 4/029* (2018.01)
(Continued)

(52) U.S. Cl.
CPC ............. *H04W 4/90* (2018.02); *H04W 4/029* (2018.02); *H04W 84/12* (2013.01); *H04W 84/18* (2013.01)

(58) Field of Classification Search
CPC ....... H04W 4/90; H04W 4/029; H04W 84/12; H04W 84/18
See application file for complete search history.

(56) References Cited

U.S. PATENT DOCUMENTS

| 5,014,345 A | 5/1991 | Comroe et al. |
| 6,999,783 B2 | 2/2006 | Toyrla et al. |

(Continued)

FOREIGN PATENT DOCUMENTS

GB     2391135 A     1/2004

OTHER PUBLICATIONS

The International Search Report and The Written Opinion, corresponding serial No. PCT/PL2016/050034 filed Jul. 29, 2016, all pages.

*Primary Examiner* — Wayne H Cai (57) ABSTRACT

A process for locating required responders in a wireless ad-hoc network of mobile computing devices (MCDs) starts with wirelessly receiving, at a second MCD directly from a first MCD, a message indicating a requested type of responder needed and a location at which the responder is needed. The second MCD then compares the requested type of responder needed to a locally stored type of responder associated with a current user. If a match is found, the second MCD alerts the current user provides a response mechanism. The second MCD then makes a forwarding determination of whether or not the message should be forwarded directly to one or more other mobile computing devices. The second MCD one of further directly wirelessly transmits and refrains from further transmitting the message to the one or more other mobile computing devices as a function of the forwarding determination.

20 Claims, 4 Drawing Sheets

(51) Int. Cl.
  *H04W 84/12* (2009.01)
  *H04W 84/18* (2009.01)

(56) References Cited

U.S. PATENT DOCUMENTS

| | | | |
|---|---|---|---|
| 7,355,991 | B2 | 4/2008 | Huang et al. |
| 8,971,850 | B2 | 3/2015 | Klein et al. |
| 9,055,390 | B2 | 6/2015 | Lor et al. |
| 2010/0177661 | A1 | 7/2010 | Dailey |
| 2013/0018658 | A1* | 1/2013 | Agapi ................ G10L 15/22 704/260 |
| 2013/0188562 | A1* | 7/2013 | Espina Perez .......... H04L 1/188 370/328 |
| 2014/0099910 | A1 | 4/2014 | Corretjer et al. |
| 2014/0269557 | A1 | 9/2014 | Mechaley |
| 2015/0289122 | A1* | 10/2015 | Friesen ................ H04W 4/02 455/404.2 |
| 2015/0359013 | A1 | 12/2015 | Krizik et al. |
| 2018/0152824 | A1* | 5/2018 | Baker .................... H04W 4/21 |

* cited by examiner

WIRELESS AD-HOC NETWORK FLOODING MECHANISM TO INTELLIGENTLY LOCATE REQUIRED RESPONDERS

BACKGROUND OF THE INVENTION

Tablets, laptops, phones, mobile or portable radios, and other mobile computing devices are now in common use by users, such as first responders and civilians, and provide such users with instant access to increasingly valuable additional information such as vehicle histories, arrest records or outstanding warrants, health information, and other information that may aid the user in responding to an incident. However, sometimes an incident demands a response by a person having a particular skill or equipment, such as a doctor, fireman, or health care provider having certain skills or equipment to better provide aid at the incident.

Thus, there exists a need for an improved method, device, and system for more quickly and intelligently locating nearby responders of a particular type for responding at a particular incident.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method, device, and system for more quickly locating nearby responders of a particular type for responding at a particular incident by using a wireless ad-hoc network flooding mechanism to intelligently located required responders.

In one embodiment a process of locating required responders in a wireless ad-hoc network of mobile computing devices includes: wirelessly receiving, at a second mobile computing device via a wireless network interface and directly from a first mobile computing device, a message indicating a requested type of responder needed and a location at which the responder is needed; comparing, by the second mobile computing device, the requested type of responder needed to a locally stored type of responder associated with a current user of the second mobile computing device; when, as a result of the comparing, it is determined that the requested type of responder needed matches the locally stored type of responder, responsively: causing an electronic alert to be provided to the current user indicating the requested type of responder needed and the location at which the responder is needed and providing one of a response mechanism via which the current user may accept or decline responding to the location and an automatic response mechanism via which responding to the location is automatically accepted by the second mobile computing device; making a forwarding determination of whether or not the message should be forwarded directly to one or more other mobile computing devices via the wireless network interface; and one of further directly wirelessly transmitting and refraining from further directly wirelessly transmitting the message to the one or more other mobile computing devices via the wireless network interface as a function of the forwarding determination.

In a further embodiment, a mobile computing device for locating required responders in a wireless ad-hoc network of mobile computing devices, the device comprising: a display displaying a user interface; a computer-readable storage medium; a wireless transceiver; and one or more processors configured to: wirelessly receiving, via the wireless transceiver and directly from a first mobile computing device, a message indicating a requested type of responder needed and a location at which the responder is needed; comparing the requested type of responder needed to a locally stored type of responder, stored in the computer-readable storage medium, associated with a current user of the second mobile computing device; when, as a result of the comparing, it is determined that the requested type of responder needed matches the locally stored type of responder, responsively: causing an electronic alert to be provided to the current user indicating the requested type of responder needed and the location at which the responder is needed and providing one of a response mechanism via which the current user may accept or decline responding to the location and an automatic response mechanism via which responding to the location is automatically accepted by the second mobile computing device; making a forwarding determination of whether or not the message should be forwarded directly to one or more other mobile computing devices via the wireless network interface; and one of, via the transceiver, further directly wirelessly transmitting and refraining from further directly wirelessly transmitting the message to the one or more other mobile computing devices as a function of the forwarding determination.

Each of the above-mentioned embodiments will be discussed in more detail below, starting with example system and device architectures via which the embodiments may be practiced, followed by an illustration of processing steps for achieving an improved method, device, and system for more quickly locating nearby responders of a particular type for responding at a particular incident by using a wireless ad-hoc network flooding mechanism to intelligently locate required responders. Further advantages and features consistent with this disclosure will be set forth in the following detailed description, with reference to the figures.

1. Communication System Architecture and Device Structure

Figure 1:
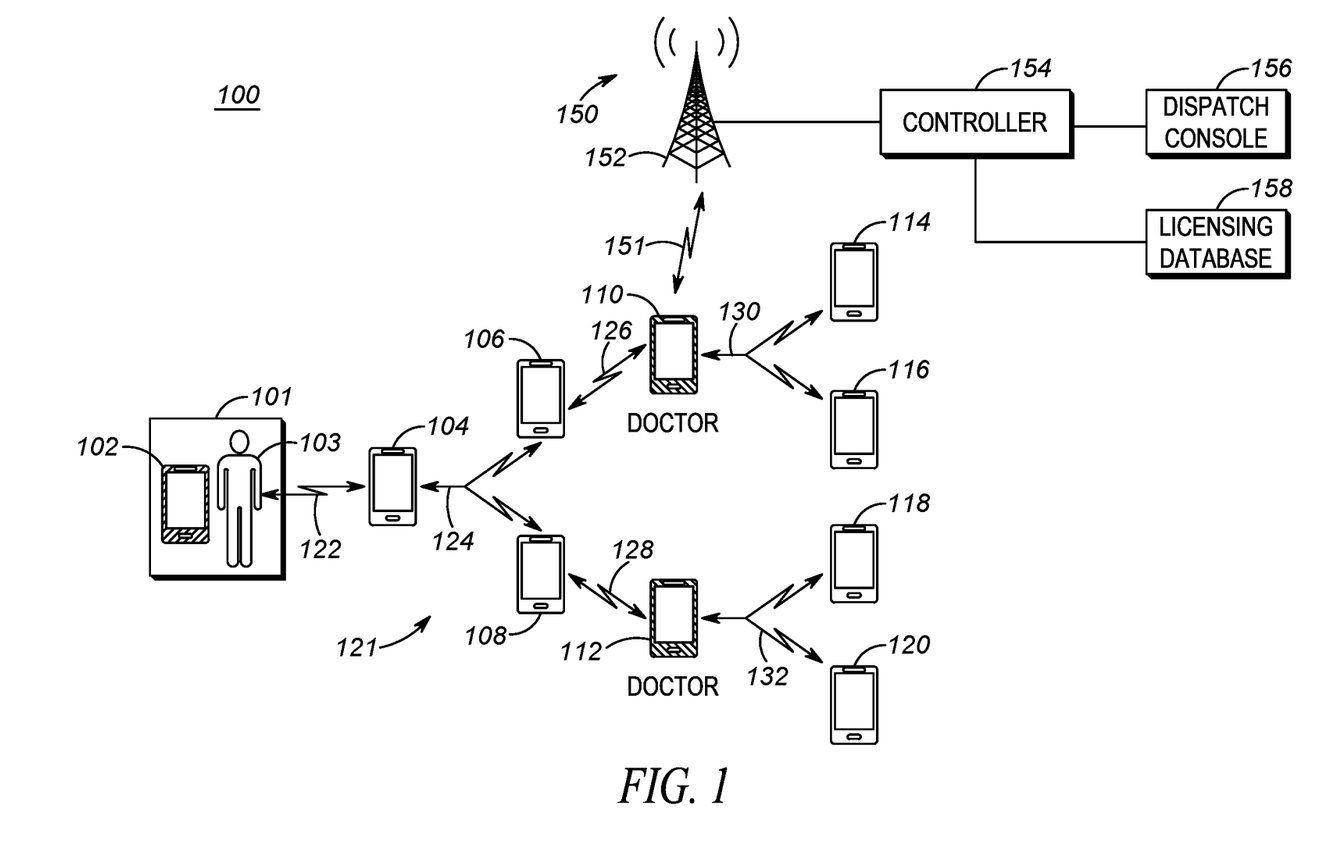
FIG. 1 is a system diagram illustrating a first mobile computing device in a wireless ad-hoc network for locating nearby mobile computing devices associated with responders of a particular type for responding at a particular incident in accordance with some embodiments.

Referring now to the drawings, and in particular FIG. 1, a communication system diagram illustrates a system 100 including a first mobile computing device 102 at an incident location 101 and associated with a first user 103 for locating nearby mobile computing devices 104-120, via a wireless ad-hoc network (e.g., a mobile ad-hoc network (MANET), a mesh network, etc., hereinafter referred to as ad-hoc network 121), each mobile computing device being associated with one or more responders of a particular responder type or types for responding at the incident location 101 in accordance with some embodiments.

The incident location 101 may be a location at which an incident has occurred, such as a theft, a medical emergency, a suspected drug infraction, or some other actual or expected event (e.g., such as a suspicious character or someone potentially matching a wanted suspect profile) in which the first user 103 believes additional aid is needed, and uses his or her first mobile computing device 102 to request such additional aid. The incident location 101 may be a location of the first user 103 and first mobile computing device 102 detected via a global positioning system (GPS) or triangulation method, or other technical locationing solution, at the mobile computing device. Additionally or alternatively, the incident location 101 may be separate or distant from the first user 103 and/or first mobile computing device 102 location and entered at the first mobile computing device 102 via a user interface of the first mobile computing device 102. For example, the first user 103 may be holding his or her first mobile computing device 102 and witness an explosion several hundred meters away or may witness a theft occurring across a street, among other possibilities.

Figure 2:
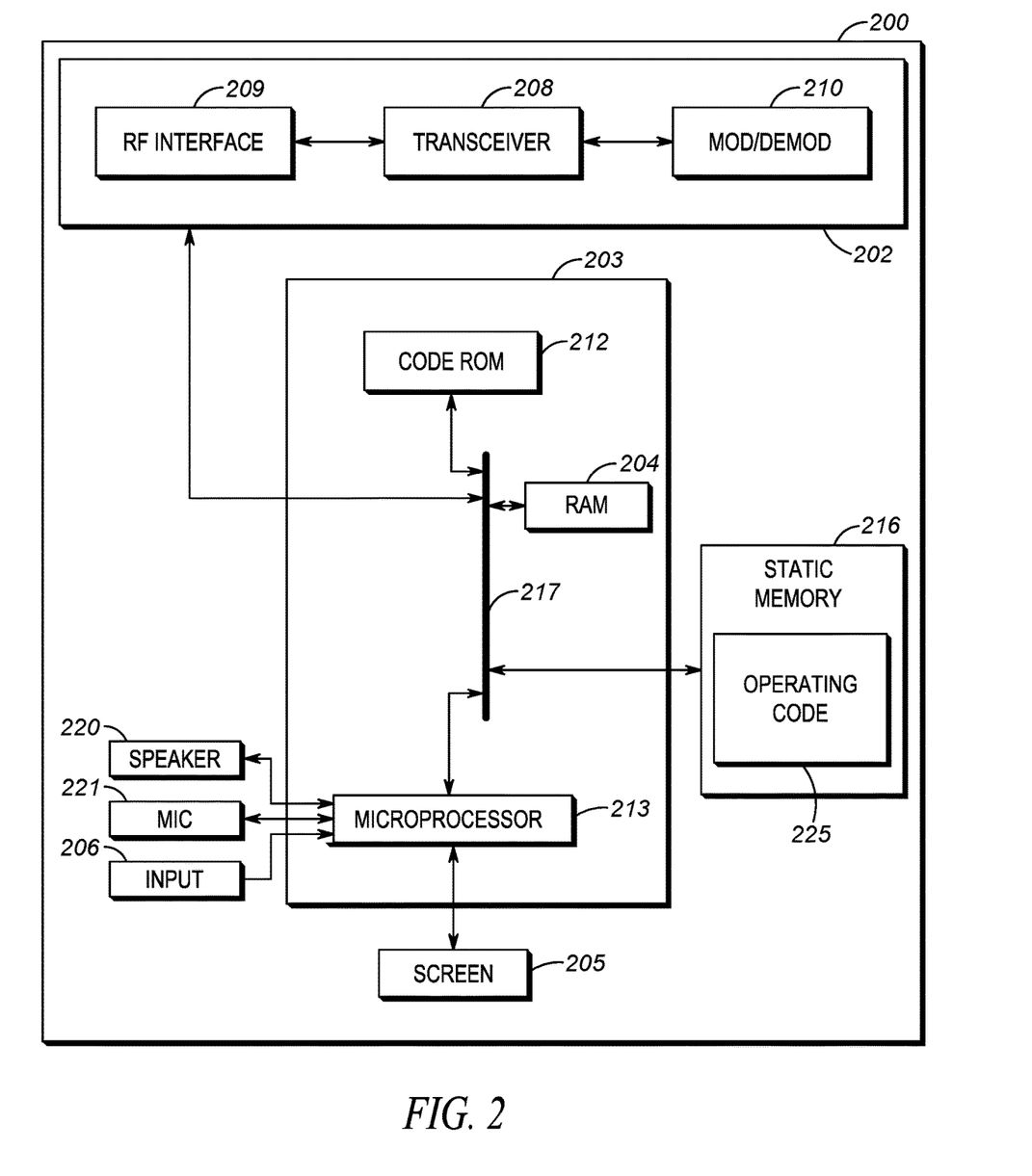
FIG. 2 is a device diagram showing a device structure of the mobile computing devices of FIG. 1 in accordance with some embodiments.

The first mobile computing device 102 may be same or similar to the device diagram showing a device structure of a mobile computing device 200 as set forth in FIG. 2. FIG. 2 is an example functional block diagram of a mobile computing device 200 in accordance with some embodiments. Other mobile computing devices such as mobile computing devices 104-120 may contain same or similar structures. As shown in FIG. 2, mobile computing device 200 includes a communications unit 202 coupled to a common data and address bus 217 of a processing unit 203. The mobile computing device 200 may also include an input unit (e.g., keypad, pointing device, etc.) 206, an output transducer unit (e.g., speaker) 220, an input transducer unit (e.g., microphone) 221, and a display screen 205, each coupled to be in communication with the processing unit 203.

The processing unit 203 may include a code ROM 212 for initializing system components. The processing unit 203 may further include a microprocessor 213 coupled, by the common data and address bus 217, to a random access memory (RAM) 204 and a static memory 216. The microprocessor 213 has ports for coupling to the display screen 205, the input unit 206, the speaker 220, and the microphone 221.

The communications unit 202 may include an RF interface 209 configurable to communicate with other mobile computing devices within its communication range and/or with base stations within its communication range such as base station 152 of FIG. 1. The communications unit 202 may include one or more wireless transceivers 208, such as an Association of Public Safety Communications Officials International (APCO) P25 transceiver, a Digital Mobile Radio (DMR) transceiver, a Terrestrial Trunked Radio (TETRA) transceiver, a Bluetooth transceiver, a Wi-Fi transceiver perhaps operating in accordance with an IEEE 802.11 standard (e.g., 802.11a, 802.11b, 802.11g, 802.11ac), a WiMAX transceiver perhaps operating in accordance with an IEEE 802.16 standard, an LTE transceiver, and/or other similar type of wireless transceiver configurable to communicate via an infrastructure and/or ad-hoc direct mode wireless network. The transceiver 208 is also coupled to a combined modulator/demodulator 210.

Static memory 216 may store operating code 225 for the microprocessor 213 that, when executed, performs one or more of the mobile computing device steps set forth below with respect to FIGS. 1, 3, and 4 and corresponding text. Static memory 216 may comprise, for example, a hard-disk drive (HDD), an optical disk drives such as a compact disk (CD) drive or digital versatile disk (DVD) drive, a solid state drive (SMD), a tape drive, a flash memory drive, or a tape drive, to name a few.

Returning to FIG. 1, after witnessing an incident, the first user 103 may use his or her first mobile computing device 102 to enter a request for additional aid (e.g., requesting a particular type of responder needed, such as identifying one or more of a career, advancement level, licensed or unlicensed skill, and equipment associated with the current user). The manner in which information is entered by the first user 103 and received by the first mobile computing device 102 may vary. In one example, the first user 103 may directly enter the type of responder required, such as selecting a health professional, fireman, military officer (in general or perhaps of a particular rank or advancement level), and/or police officer from a list of types of responders to request displayed on a display of the first mobile computing device 102.

In other embodiments, the first user 103 may select a particular type of incident via a user interface of the first mobile computing device 102 and the first mobile computing device 102 may then access a locally or remotely stored mapping that maps required type or types of responders to various potential incident types. For example, such a mapping may be similar to that set forth in Table I:

TABLE I

Example Incident to Required Responder Type Mapping

| Type of Incident | Type of Responder | Number Required |
|---|---|---|
| Fire (building) | Fireman | 2 |
|  | Police | 1 |
| Suspected Drug Transaction | Police w/Canine Unit | 1 |
| Medical Emergency | Nurse or Doctor | 2 |

As set forth in Table I above, the first user 103 may witness what looks like a building fire, and use his or her mobile computing device's display 205 and input interface 206 to select "building fire" from a list of possible incident types. The selection of "building fire" from the list would correspondingly generate a request for a fireman type of responder (x2) and a police type of responder (x1). Some types of responders may also recite a required equipment, such as a canine unit for a suspected drug transaction or a breathing apparatus for a large fire, and some types of responders may be set forth in the alternative, where for example either a nurse or a doctor type of responder would be sufficient to respond to the medical emergency type of incident. Other variations of the foregoing are possible as well. Other methods of mapping incident types to types and number of responders required is also possible.

Once the first mobile computing device 102 has identified the required responder types (and optionally, a number thereof and/or an equipment required thereof), the first mobile computing device 102 generates a request message for transmission to nearby mobile computing devices 104-120 via the wireless ad-hoc network 121 identifying the required responder type or types (and optionally including the number thereof and/or an equipment required thereof). The generated request message may also be populated with a current location of the first mobile computing device 102 automatically determined via a global positioning system (GPS) circuit, a triangulation method, or some other location-determination process, may additionally or alternatively be populated with a separate location of the incident requiring a response as entered by the first user 103 (i.e., an address, intersection, building name, latitude/longitude pair, or other unique identification information entered via a user interface of the first mobile computing device 102), may also be populated with an identity of the first user 103 associated with the first mobile computing device (e.g., name, home address, driver's license number, phone number, or other unique identifier), and may also be populated with an identity of the type of incident occurring at the requested location.

Once the request message is generated, it is directly transmitted to one or more other mobile computing devices within a direct-mode, wireless ad-hoc network transmit range of the first mobile computing device 102 via, for example, the RF interface 209 of mobile computing device 200 or similar transceiver device. The message may be transmitted over a wireless link 122 portion of the wireless ad-hoc network 121 in accordance with any one or more of the wireless protocols set forth above with respect to the RF interface 209 of FIG. 2. In the example set forth in FIG. 1, only mobile computing device 104 is within direct wireless transmission range of first mobile computing device 102 and receives the message transmitted by the first mobile computing device 102. The message may, for example, be transmitted in a SIP MESSAGE packet transmitted over a Bluetooth wireless link 122 and received by mobile computing device 104. Other messaging protocols and other types of wireless links are possible as well.

On receipt, mobile computing device 104 decodes the message and extracts the (one or more) type or types of responder requested (among any other of the information already cited above as potentially additionally being included in the message) and the mobile computing device 104 determines if a user (not illustrated) of the mobile computing device 104 has a one of the career, advancement level, licensed or unlicensed skill, or equipment that matches the type of responder requested in the message. For example, the mobile computing device 104 user may configure a setting in the mobile computing device 104 to reflect the one or more of the career, advancement level, licensed or unlicensed skill, or equipment that they wish to be associated with and to which they are uniquely skilled for responding to requested incidents. For example, the mobile computing device 104 user may be qualified as both a doctor and a veterinarian, and to the extent that the type of responder set forth in the message identifies one or both of a doctor and a veterinarian, the mobile computing device 104 finds a match and takes further corresponding action. On the other hand, if the mobile computing device 104 user were qualified as a firefighter and the type of responder set forth in the message identified one or both of a doctor and a veterinarian, the mobile computing device 104 does not find a match and takes further corresponding action. In some embodiments, the mobile computing device 104 may verify the career, advancement level, licensed or unlicensed skill, or equipment that the mobile computing device 104 user enters via an external licensing or equipment database available remote from the mobile computing device 104 before saving the responder type parameter locally and using it to match against requested types of responders. Other verification methods are also possible.

Assuming the mobile computing device 104 finds a match, the further corresponding action taken may comprise transmitting an acknowledgment back to the source device (in this case, the first mobile computing device 102) indicating the match (and in particular, which particular responder type matched if multiple were requested), and may include additional information such as a distance or estimated time of arrival from the mobile computing device 104's determined location to the location of the first mobile computing device 102 (included in the message) and an identity (name, phone number, organization association, etc.) of the user of the mobile computing device 104, among other possible information.

The mobile computing device may also provide information to the user of the mobile computing device 104 that the match was made (e.g., alphanumeric text displayed on a screen 205 of the mobile computing device 200 or an alert tone played back via a speaker 220 of the mobile computing device 200), and provide information to the user via one of the display (alphanumeric text or a rendered map) or speaker (via a text-to-voice function) regarding one or more of a location of the incident 101, the type of responder that was requested and matched, the identity of the first user 103 (e.g., name, home address, driver's license number, phone number, or other unique identifier) associated with the first mobile computing device 102, and an identity of the type of incident occurring at the location 101 at which the responder is needed.

Figure 3:
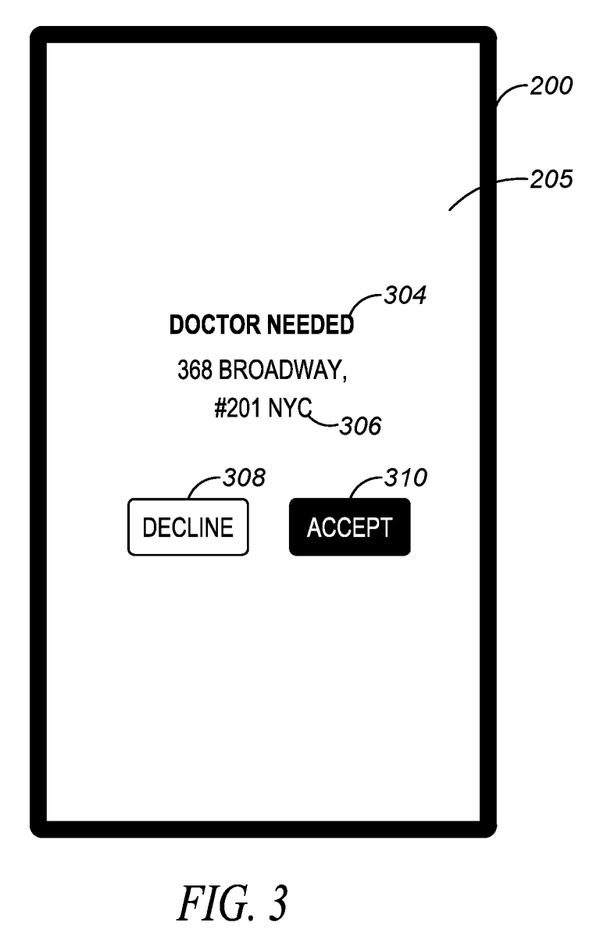
FIG. 3 is a device diagram showing a device display of a mobile computing device that may be used to locate responders of a particular type and provide a response mechanism in accordance with some embodiments.
Figure 4:
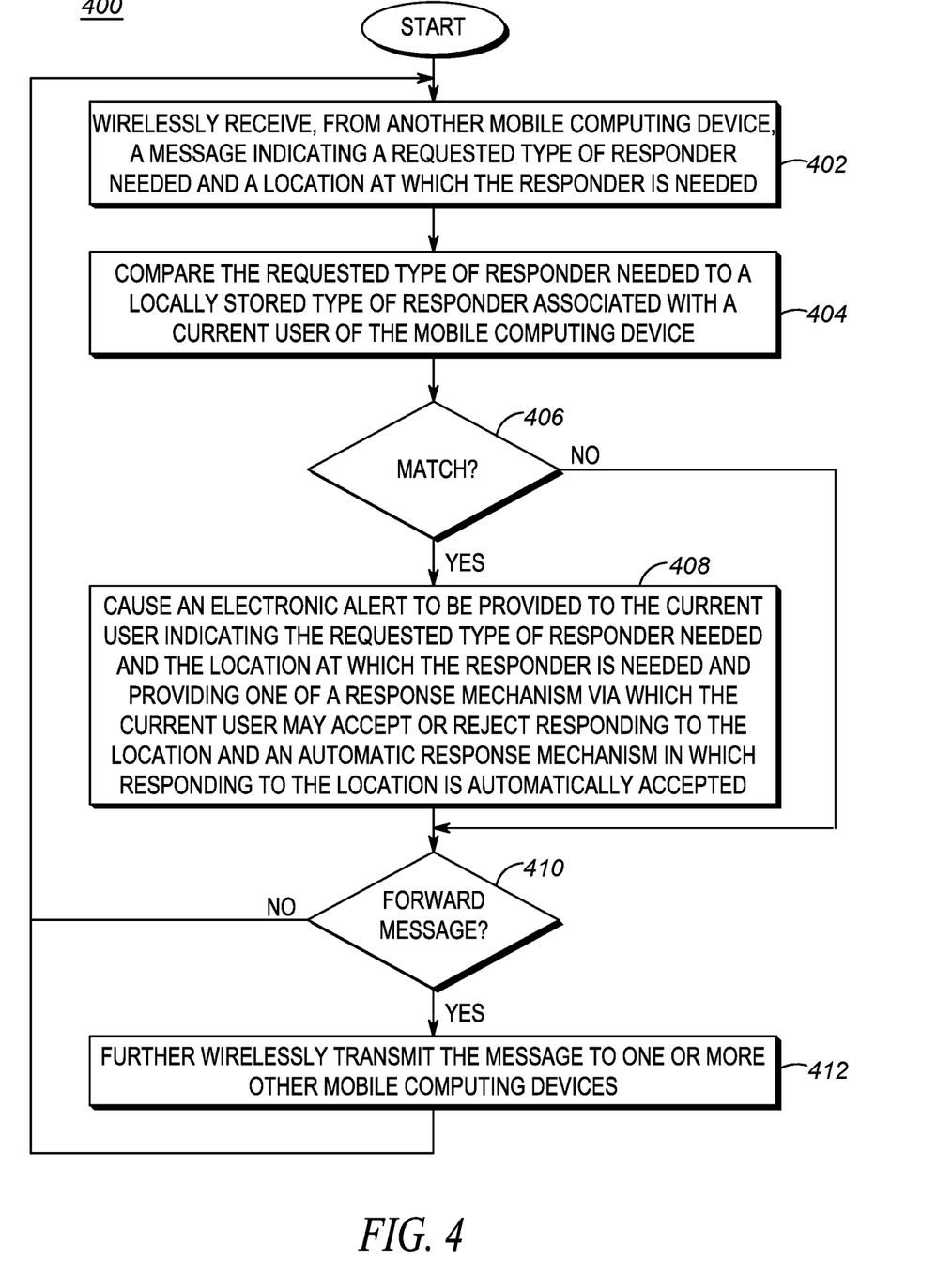
FIG. 4 illustrates a flow chart setting forth process steps for operating a mobile computing device such as those set forth in FIGS. 1, 2, and/or 3 to more quickly and intelligently locate nearby responders of a particular type for responding at a particular incident in accordance with some embodiments.

In another embodiment, and as illustrated in FIG. 3, instead of automatically accepting a request when a match is found, the receiving mobile computing device 104/200 may provide on a display 205 an indication of the type of responder 304 that was requested and matched, the location 306 of the incident 102, and a response mechanism for accepting or declining the request for response. As set forth in FIG. 3, the response mechanism may include a decline button 308 (touch-sensitive button or hard mechanical button) and an accept button 310 (touch-sensitive button or hard mechanical button). If the user activates the decline button 308, the mobile computing device 104/200 may process the request message just as if no match was found and may subsequently forward on the request message in a similar manner as that set forth herein. If, on the other hand, the user activates the accept button 310, the mobile computing device 104/200 may take action similar to that set forth herein when an automatic match was found. In still other embodiments, the speaker 220 of the mobile computing device 104/200 may be used to broadcast a voice instruction to accept or decline the assignment, and the microphone input 221 used to detect a voice instruction indicating an acceptance (e.g., "accept it") or rejection (e.g., "decline it"). Other interface modalities are possible as well.

After finding a match and/or otherwise accepting the request, the mobile computing device 104 decrements (by one) the number of the type of responder that matched as set forth in the originally received request message. If, after the decrement, the number of additional responders of that type becomes zero (0), the mobile computing device 104 refrains from further transmitting the message. The source device (first mobile computing device 102), after receiving the notification of a match from mobile computing device 104, would transmit an updated request message including the updated number of responders of that type needed (in this case, zero, effectively halting any other mobile computing devices implementing a transmit delay from further transmitting the message on through the wireless ad-hoc network 121).

In some further embodiments, after finding a match and/or otherwise accepting the request at the mobile computing device 104, the mobile computing device 104 may transmit the acceptance back to the source device indicating the match in a manner as noted above, but may wait to receive a source device acceptance indication from the source device. Only once the source device accepts the mobile computing device 104's offer of assistance may the mobile computing device 104 indicate ultimate acceptance to its user and proceed with decrementing the number of the type of responder that matched and further taking any other actions as a result of the match as set forth herein.

On the other hand, if, after the decrement noted above, the number of additional responders of that responder type is still greater than zero (>0), the mobile computing device 104 continues forwarding on the received message (as modified) to additional mobile computing devices via wireless ad-hoc network 121, perhaps after delaying a determined amount of time in order to allow for any updated matches from other mobile computing devices in the wireless ad-hoc network 121 to filter back to the mobile computing device 104 from the source device and further decrement the number of additional responders of that type still needed. The determined amount of time may be set to a predetermined value, such as 500 ms, 1 s, or 5 s, or may be set to some variable value that varies based on an average hop time in the wireless ad-hoc network 121 determined by the mobile computing device 104 or other mobile computing device in the network and reported to the mobile computing device 104. For example, if the mobile computing device 104 determines that the average hop time to receive a message from an adjacent mobile computing device (mobile computing devices 102, 106, 108) is 100 ms, it may multiply that value by some predetermined value (such as 2, 4, 6, or 8) and use that dynamically determined value for the determined delay before forwarding the message on to other mobile computing devices in the wireless ad-hoc network 121. Other methods of determining average hop times could be used as well.

Assuming instead that the mobile computing device 104 does not find a match or the request is declined, it may wait the determined amount of time and then forward the message on to additional mobile computing devices 106 and 108 via wireless link 124 in the ad-hoc network 121 that may have been within direct wireless transmit range of mobile computing device 104 but not within direct wireless transmit range of first mobile computing device 102. The wireless link 124 may be of the same or different protocol than the wireless link 122. Mobile computing devices 106 and 108 then perform substantially the same steps as set forth above with respect to mobile computing device 104.

Further assuming that the mobile computing devices 106, 108 both do not find a match or decline the request, they may again wait determined amounts of time (same or different as mobile computing device 104) and then forward the message on to additional mobile computing devices 110, 112 via wireless links 126, 128 in the wireless ad-hoc network 121 in a similar manner as that set forth above.

In an embodiment in which the request message requested a doctor type of responder and requested three (3) of them, and in which both mobile computing devices 110 and 112 are associated with doctors (but none of the previous mobile computing devices were associated with doctors), each mobile computing device 110, 112 finds a match, locally decrements the count of doctors requested from three (3) to two (2), and each transmits a match message back to the first mobile computing device 102 via respective wireless links 126, 124, 122 and 128, 124, 122 indicating that a match was found. In this embodiment, it is assumed that each of the mobile computing devices 110, 112 delays a determined amount of time sufficient to receive an updated request message from the source device before further forwarding the request message (now decremented to two (2)) on to further mobile computing devices 114, 116 and 118, 120 respectively. Once the source device receives both match messages from respective mobile computing devices 110, 112, it decrements its own count of the number of responders of the doctor type requested that have been located (decremented to one (1)), and transmits an updated request message including the updated decremented count (1) of doctors requested. Assuming that mobile computing devices 110, 112 receive the updated request message during their determined delay times, each will further update their locally maintained count of number of doctor type responders requested to one (1), and then proceed after expiration of the determined delay time to respectively forward on the modified request message to mobile computing devices 114, 116 via wireless link 130 in wireless ad-hoc network 121 and to mobile computing devices 118, 120 via wireless link 132 in wireless ad-hoc network 121.

In some embodiments, and as illustrated in FIG. 1, certain or all mobile computing devices finding a match between a requested type of responder and a locally stored type of responder associated with a user thereof, such as mobile computing device 110 of FIG. 1, may use an infrastructure connection (if available) to an infrastructure radio access network (RAN) 150 for any one of a number of functions.

Infrastructure RAN 150 may implement over wireless link 151 a conventional or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, infrastructure RAN 150 may additionally or alternatively implement over wireless link 151 a Long Term Evolution (LTE) protocol including multimedia broadcast multicast services (MBMS), an open mobile alliance (OMA) push to talk (PTT) over cellular (OMA-PoC) standard, a voice over IP (VoIP) standard, or a PTT over IP (PoIP) standard. In still further embodiments, infrastructure RAN 150 may additionally or alternatively implement over wireless link 151 a Wi-Fi protocol perhaps in accordance with an IEEE 802.11 standard (e.g., 802.11a, 802.11b, 802.11g) or a WiMAX protocol perhaps operating in accordance with an IEEE 802.16 standard. Other types of wireless protocols could be implemented as well. The infrastructure RAN 150 is illustrated in FIG. 1 as providing coverage for the mobile computing device 110 via a single fixed terminal 152 coupled to a controller 154 (e.g., radio controller, call controller, PTT server, zone controller, MME, BSC, MSC, site controller, Push-to-Talk controller, or other network device) that is further coupled to a dispatch console 158 operated by a dispatcher and a licensing database 158.

Mobile computing device 110 (and other mobile computing devices within its coverage) may use the infrastructure network 150 to, for example, access the licensing database 158 at the time of receiving the request message (or at periodic times prior thereto or at a time of initial entry by a user of the mobile computing device) to further confirm or validate the type of responder of the user of the mobile computing device 110. The mobile computing device 110 may refrain from finding a match until a request including information sufficient to identify the user of the mobile computing device 110 is transmitted to the licensing database 158 and a positive validation response is received from the licensing database 158.

In other embodiments, the mobile computing device 110 may use the infrastructure RAN 150 to transmit a notice to a dispatch console 156 associated with a dispatcher or otherwise to some public safety answering point (PSAP) indicating that it has received a request for aid and including the information included in the request message. Such a transmission of information to nearby authorities provides two important functions, first, it allows the authorities to dispatch a response to the incident location 101 as well (even though that response will likely take longer than the nearby aid provided by the user of the mobile computing device 110) and, second, it may protect the user of the mobile computing device 110 from nefarious users (e.g., a user of the source device) that may otherwise use the service to lure in nearby responders with fraudulent emergencies by dispatching a formal first responder (perhaps according to the type of responder requested) to the same incident location 101 requested by the user of the source device.

Although FIG. 1 illustrates the request message ending with mobile computing devices 114-120 for ease of illustration, in the above example where the number of responders requested is still greater than zero (0), the mobile computing devices 114-120 may continue forwarding the updated request message until the requested number is met (perhaps after a determined delay). In other embodiments, the request message may include a maximum hop count of, for example, four (4), that each intervening mobile computing device decrements independent of whether or not a match is found, in which case, the mobile computing devices 114-120 may decrement the maximum hop count to zero after receiving the request message, and may refrain from further forwarding the message to additional mobile computing devices (not illustrated in FIG. 1). Once the maximum hop count is reached, the device that decrements the count to zero may transmit a message back to the source device indicating that the maximum hop count has been reached, allowing the source device the option to send out another request message with an increased hop count value or a different type of responder if the number and type of responders initially requested could not be reached.

In still other embodiments, each mobile computing device in the wireless ad-hoc network 121 may employ a duplicate request message function that refrains from further forwarding a request message it has already received, and in an embodiment in which no further mobile computing devices besides those 102-120 illustrated in FIG. 1 are within wireless transmission range of mobile computing devices 114-120, the request message may be re-transmitted by mobile computing devices 114-120 but no other mobile computing devices will receive it that have not already received it, in which case the chain of transmission will end. The source device may implement a timer that, after a maximum period of time such as 15, 30, or 60 seconds, sends out a second request message with the current updated remaining number of responders needed (or with a different type of responder indicated) in hopes that some new mobile computing devices or some previously existing mobile computing devices having different responder type or types are already within or have moved within range of the wireless ad-hoc network 121.

2. Process for Operating a Mobile Computing Device to Use a Wireless Ad-hoc Network Flooding Mechanism to Intelligently Locate Required Responders Turning now to FIG. 4, a flow chart diagram illustrates a process 400 for an intermediate mobile computing device, such as those 104-120 set forth in FIG. 1 and/or that 200 set forth in FIGS. 2 and 3, to use a wireless ad-hoc network flooding mechanism to intelligently locate required responders. While a particular order of processing steps, message receptions, and/or message transmissions is indicated in FIG. 4 for exemplary purposes, timing and ordering of such steps, receptions, and transmissions may vary where appropriate without negating the purpose and advantages of the examples set forth in detail throughout the remainder of this disclosure.

Method 400 begins at step 402 where a mobile computing device directly wirelessly receives, from another mobile computing device, a request message indicating a requested type of responder needed and a location at which the responder is needed. The request message received at step 402 may be same or similar to that set forth above as described with respect to FIGS. 1-3.

At step 404, the mobile computing device compares the requested type or types of responder needed as set forth in the request message to a locally stored type of responder (or types of responder) stored at the mobile computing device and associated with a current user of the mobile computing device. The type of responder may be entered by a user of the mobile computing device and optionally verified via a licensing database in a same or similar manner to that set forth above as described with respect to FIGS. 1-3. The type of responder requested in the request message and the type of responder of the current user of the mobile computing device may identify, for example, one or more of a career, advancement level or rank, licensed or unlicensed skill, and equipment.

At step 406, the mobile computing device determines if there is a match between the type (or types) of responder requested in the request message and the type (or types) of responder associated with the current user of the mobile computing device. If no match is found, processing proceeds to step 410. On the other hand, if a match is found, processing proceeds to step 408.

At step 408, the mobile computing device causes an electronic alert to be provided to its current user indicating the requested type of responder needed and the location at which the responder is needed. The mobile computing device may also provide one of a response mechanism via which the current user may accept or decline the matching request and an automatic matching response mechanism via which the request is automatically accepted. The automatic response and the response mechanism may be the same or similar to that already set forth above with respect to FIGS. 1-3.

At step 410, the mobile computing device determines whether or not to forward the (modified or unmodified) request message (the determination at step 410 is executed by the mobile computing device independent of whether a match was found at step 406, although the result of step 406 may affect the determination at step 410). As set forth above, the determination of whether to forward the request message may be determined as a function of one or more of the number of the types of responder requested, whether the mobile computing device automatically or user-responsively accepted the request, whether other mobile computing devices automatically or user-responsively accepted the request, a maximum hop count and a current hop count associated with the request message, and whether the mobile device has already received the same request message before. The determination at step 410 may, in some embodiments and as set forth above with respect to FIGS. 1-3 above, be made after a determined delay time in which the mobile computing device waits to receive one or more updated request messages reflective of other mobile computing devices automatically or user-responsively accepting the request.

If the mobile computing device, immediately or after a delay, determines at step 410 not to forward the request message further in the wireless ad-hoc network, for any one or more of the reasons already set forth above with respect to FIGS. 1-3, process 400 returns to step 402 and awaits receipt of another request message from a same or different source device.

If, on the other hand, the mobile computing device, immediately or after a delay, determines at step 410 to forward the request message further in the wireless ad-hoc network, the mobile computing device at step 412 further transmits the request message (modified or unmodified) to other mobile computing devices in the wireless ad-hoc network. These other mobile computing devices may then similarly begin executing steps 402-412 independent of the mobile computing device.

3. Conclusion

In accordance with the foregoing, an improved device, method, and system is disclosed for more quickly locating nearby responders of a particular type for responding at a particular incident by using a wireless ad-hoc network flooding mechanism to intelligently located required responders. As a result of the foregoing, a nearby person having particular skills or equipment (among other things) needed for responding at an incident can be more quickly and efficiently located, saving valuable time and resources. Additionally, the disclosed method, device, and system does not require back-end infrastructure connectivity in locating the required responders, although such infrastructure may be used to provide additional features and functionality as set forth above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of locating required responders in a wireless ad-hoc network of mobile computing devices, the method comprising:
   wirelessly receiving, at a second mobile computing device via a wireless network interface and directly from a first mobile computing device, a message indicating a requested type of responder needed and a location at which the responder is needed;
   comparing, by the second mobile computing device, the requested type of responder needed to a locally stored type of responder associated with a current user of the second mobile computing device;
   when, as a result of the comparing, it is determined that the requested type of responder needed matches the locally stored type of responder, responsively:
      causing an electronic alert to be provided to the current user indicating the requested type of responder needed and the location at which the responder is needed and providing one of a response mechanism via which the current user may accept or decline responding to the location and an automatic response mechanism via which responding to the location is automatically accepted by the second mobile computing device;
   making a forwarding determination of whether or not the message should be forwarded directly to one or more other mobile computing devices via the wireless network interface; and
   one of further directly wirelessly transmitting and refraining from further directly wirelessly transmitting the message to the one or more other mobile computing devices via the wireless network interface as a function of the forwarding determination.

2. The method of claim 1, wherein it is determined that the requested type of responder needed matches the locally stored type of responder and the second mobile computing device receives an indication that the current user has accepted responding to the location, responsively transmitting an indication that the user has accepted in a separate message, via the wireless ad-hoc network and the another mobile computing device, to a source device that originated the message.

3. The method of claim 2, further comprising receiving, via the wireless ad-hoc network and the another mobile computing device, an acknowledgment from the source device indicating that the source device has accepted the current user's acceptance to respond to the location.

4. The method of claim 1, wherein making the forwarding determination comprises delaying further transmitting the message for a predetermined period of time and, in that period of time, receiving an indication that some other mobile computing device having a locally stored type of responder matching the requested type of responder has accepted responding to the location, and responsively refraining from further transmitting the message to one or more other mobile computing devices via the wireless local area network interface.

5. The method of claim 1, wherein making the forwarding determination comprises delaying further transmitting the message for a predetermined period of time and, in that period of time, receiving no indication that some other mobile computing device having a locally stored type of responder matching the requested type of responder has already accepted responding to the location, and responsively further transmitting the message to one or more other mobile computing devices via the wireless network interface.

6. The method of claim 1, wherein the message indicates a number of the requested type of responder needed at the location that is greater than one.

7. The method of claim 6, wherein it is determined that the requested type of responder needed matches the locally stored type of responder and the second mobile computing device detects an indication that the current user has accepted responding to the location, responsively:
   transmitting, via the wireless local area network and the another mobile computing device, an indication that the user has accepted in a separate message to a source device that originated the message; and
   decrementing the number of the requested type of responder needed prior to making the forwarding determination.

8. The method of claim 7, wherein the forwarding determination comprises determining that the number of the requested type of responded needed is still greater than zero after decrementing the number of the requested type of responder needed, and responsively further transmitting the message to one or more other mobile computing devices via the wireless network interface as a function of the forwarding determination.

9. The method of claim 7, wherein the forwarding determination comprises determining that the number of the requested type of responded needed is zero after decrementing the number of the requested type of responder needed, and responsively refraining from transmitting the message to one or more other mobile computing devices via the wireless network interface as a function of the forwarding determination.

10. The method of claim 1, wherein causing the electronic alert to be provided to the current user comprises displaying an alphanumeric message on a display of the second mobile computing device indicating the requested type of responder needed and the location at which the responder is needed; and
   wherein providing the response mechanism via which the user may accept or decline responding to the location comprises displaying accept and decline options on the screen and receiving one of a touch input on the display corresponding to areas at which the accept or decline options are graphically displayed and a touch input of a mechanical button associated with the accept or decline options.

11. The method of claim 1, wherein causing the electronic alert to be provided to the current user comprises converting the contents of the message to audio and playing back the audio via a speaker output, and wherein providing the response mechanism via which the user may accept or decline responding to the location comprises receiving user voice via a microphone input associated with accepting or declining responding to the location.

12. The method of claim 1, further comprising the second mobile computing device receiving an indication that the current user has accepted responding to the location, and responsively:
    determining, by the second mobile computing device, that an infrastructure wireless network connection is available via an infrastructure wireless interface and transmitting an indication that the current user has accepted responding to the location to an public safety answering point or emergency dispatcher.

13. The method of claim 1, wherein one of:
    the message further comprises an identity of a user associated with a source device that originated the message, and wherein causing the electronic alert to be provided to the current user further comprises providing the identity of the user associated with the source device to the current user; and
    the message further comprises an identity of a type of incident occurring at the location at which the responder is needed, and wherein causing the electronic alert to be provided to the current user further comprises providing the identity of the type of incident occurring to the current user.

14. The method of claim 1, further wherein:
    making the forwarding determination of whether or not the message should be forwarded to other mobile computing devices via the wireless network interface comprises determining if the message has already been received once by the second mobile computing device;
    if the determination is that the message has not been received once by the second mobile computing device, further transmitting the message to one or more other mobile computing devices via the wireless network interface as a function of the forwarding determination; and
    if the determination is that the message has been received once by the second mobile computing device, refraining from further transmitting the message to one or more other mobile computing devices via the wireless network interface as a function of the forwarding determination.

15. The method of claim 1, wherein one of:
    the message includes a plurality of different requested types of responders needed at the location at which the responder is needed and the second mobile computing device includes a plurality of locally stored types of responder associated with the current user, and the step of comparing comprises the second mobile computing device comparing each of the requested types of responders from the message to each of the locally stored types of responder associated with the current user of the second mobile computing device.

16. The method of claim 1, wherein making the forwarding determination comprises delaying further transmitting the message for a predetermined period of time set to a value sufficient to allow other mobile computing devices to accept the request.

17. The method of claim 16, wherein the predetermined period of time is greater than or equal to two times of an average hop time in the wireless ad-hoc network determined by the second mobile computing device.

18. The method of claim 1, wherein the type of responder needed identifies one or more of a career, advancement level, licensed or unlicensed skill, and equipment associated with the current user.

19. The method of claim 1, wherein the type of responder needed identifies one or more of a fireman, police officer, military officer, and healthcare professional.

20. A mobile computing device for locating required responders in a wireless ad-hoc network of mobile computing devices, the device comprising:
    a display displaying a user interface;
    a computer-readable storage medium;
    a wireless transceiver; and
    one or more processors configured to:
        wirelessly receiving, via the wireless transceiver and directly from a first mobile computing device, a message indicating a requested type of responder needed and a location at which the responder is needed;
        comparing the requested type of responder needed to a locally stored type of responder, stored in the computer-readable storage medium, associated with a current user of the second mobile computing device;
        when, as a result of the comparing, it is determined that the requested type of responder needed matches the locally stored type of responder, responsively:
        causing an electronic alert to be provided to the current user indicating the requested type of responder needed and the location at which the responder is needed and providing one of a response mechanism via which the current user may accept or decline responding to the location and an automatic response mechanism via which responding to the location is automatically accepted by the second mobile computing device;
        making a forwarding determination of whether or not the message should be forwarded directly to one or more other mobile computing devices via the wireless network interface; and
        one of, via the transceiver, further directly wirelessly transmitting and refraining from further directly wirelessly transmitting the message to the one or more other mobile computing devices as a function of the forwarding determination.

* * * * *